United States Patent
Nomura

(10) Patent No.: US 11,815,362 B2
(45) Date of Patent: Nov. 14, 2023

(54) MAP DATA GENERATION APPARATUS

(71) Applicant: DENSO CORPORATION, Kariya (JP)

(72) Inventor: Toshio Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 152 days.

(21) Appl. No.: 17/558,951

(22) Filed: Dec. 22, 2021

(65) Prior Publication Data

US 2022/0113162 A1 Apr. 14, 2022

Related U.S. Application Data

(63) Continuation of application No. PCT/JP2020/023592, filed on Jun. 16, 2020.

(30) Foreign Application Priority Data

Jul. 3, 2019 (JP) .................. 2019-124462

(51) Int. Cl.
  *G01C 21/00* (2006.01)
  *G08G 1/01* (2006.01)
  *G06V 20/58* (2022.01)
  *G06V 20/56* (2022.01)

(52) U.S. Cl.
  CPC ..... *G01C 21/3859* (2020.08); *G01C 21/3815* (2020.08); *G01C 21/3841* (2020.08); *G08G 1/0112* (2013.01); *G06V 20/582* (2022.01); *G06V 20/588* (2022.01)

(58) Field of Classification Search
  CPC ............ G01C 21/3859; G01C 21/3815; G01C 21/3841; G01C 21/3874; G08G 1/0112; G08G 1/0129; G08G 1/04; G08G 1/096791; G08G 1/0104; G08G 1/048; G08G 1/096708; G08G 1/0969; G06V 20/582; G06V 20/588; G09B 29/00
  See application file for complete search history.

(56) References Cited

U.S. PATENT DOCUMENTS

| 2016/0259814 A1 | 9/2016 | Mizoguchi |
| 2017/0031359 A1 | 2/2017 | Shashua et al. |
| 2018/0252536 A1 | 9/2018 | Dorum |
| 2020/0088538 A1 | 3/2020 | Sekiyama |

FOREIGN PATENT DOCUMENTS

| CN | 105702152 A | 6/2016 |
| CN | 105937912 A | 9/2016 |
| JP | 2019095569 A | 6/2019 |

*Primary Examiner* — Alan D Hutchinson
(74) *Attorney, Agent, or Firm* — Harness, Dickey & Pierce, P.L.C.

(57) ABSTRACT

In a map data generation apparatus, probe map data is generated for each of data management units corresponding to (i) road sections, (ii) road links, or (iii) meshes into which a map is divided, based on a plurality of probe data collected from a plurality of vehicles. Difference data are obtained by comparing basic map data with the probe map data; the basic map data is updated based on a plurality of difference data, for each of the data management units. A transient data is discriminated from data corresponding to the probe data or the difference data; the transient data is excluded from the data.

7 Claims, 9 Drawing Sheets

MAP DATA GENERATION APPARATUS

CROSS REFERENCE TO RELATED APPLICATIONS

The present application is a continuation application of International Patent Application No. PCT/JP2020/023592 filed on Jun. 16, 2020, which designated the U.S. and claims the benefit of priority from Japanese Patent Application No. 2019-124462 filed on Jul. 3, 2019. The entire disclosures of all of the above applications are incorporated herein by reference.

TECHNICAL FIELD

The present disclosure relates to a map data generation apparatus that generates and updates map data based on collecting probe data from a plurality of vehicles.

BACKGROUND

For example, as a technology for generating a digital road map used for a car navigation apparatus or automatic driving control, a system that generates/updates map data based on probe data collected from a plurality of probe cars can be considered. This system connects communicably multiple vehicles, which are probe cars, to a center. The center collects, as probe data, (i) the image data taken by in-vehicle cameras along the running of the respective vehicles and (ii) the running position data of the respective vehicles. Then, the center reproduces the traveling locus of each road from the probe data and updates the map data based on the difference detected from the map data in the database.

SUMMARY

According to an example of the present disclosure, a map data generation apparatus is provided as follows. In the map data generation apparatus, probe map data is generated for each of data management units corresponding to (i) road sections, (ii) road links, or (iii) meshes into which a map is divided, based on a plurality of probe data collected from a plurality of vehicles. Difference data are obtained by comparing basic map data with the probe map data; the basic map data is updated based on a plurality of difference data, for each of the data management units. A transient data is discriminated from data corresponding to the probe data or the difference data; the transient data is excluded from the data.

BRIEF DESCRIPTION OF DRAWINGS

The above and other objects, features, and advantages of the present disclosure will become more apparent from the following detailed description made with reference to the accompanying drawings. In the drawings.

DETAILED DESCRIPTION

(1) First Embodiment

Figure 1:
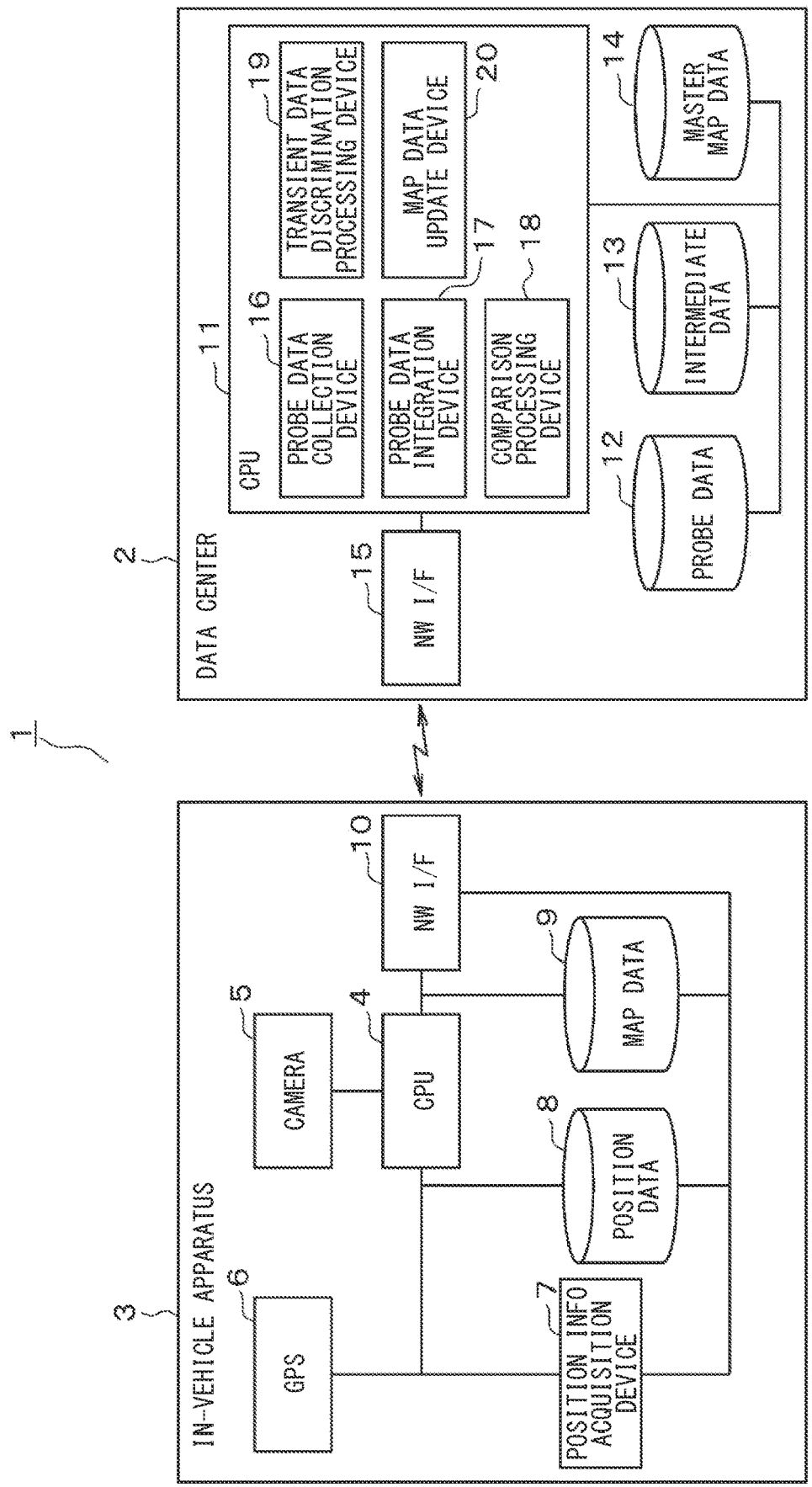
FIG. 1 is a block diagram schematically showing an electrical configuration of a map generation system according to a first embodiment.
Figure 2:
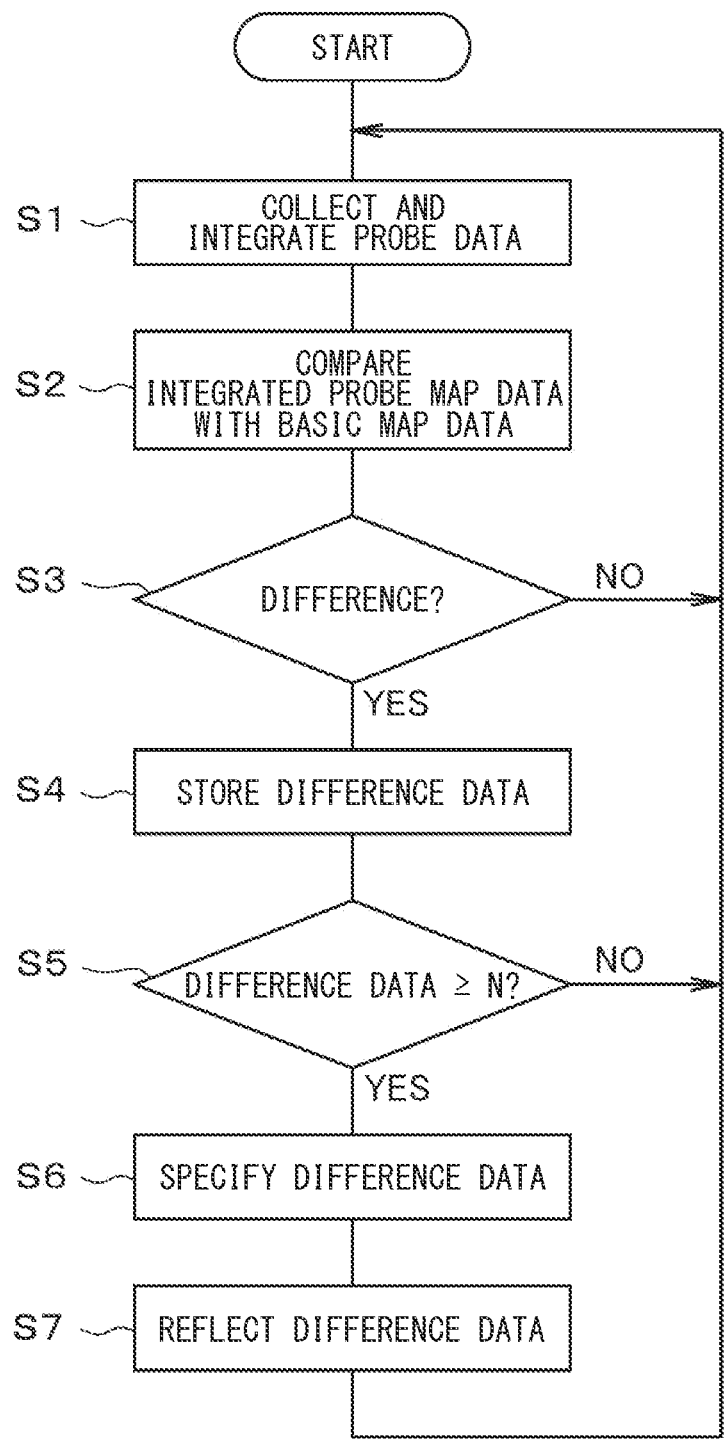
FIG. 2 is a flowchart schematically showing processing steps of a basic map data update executed by a CPU in a data center.
Figure 3:
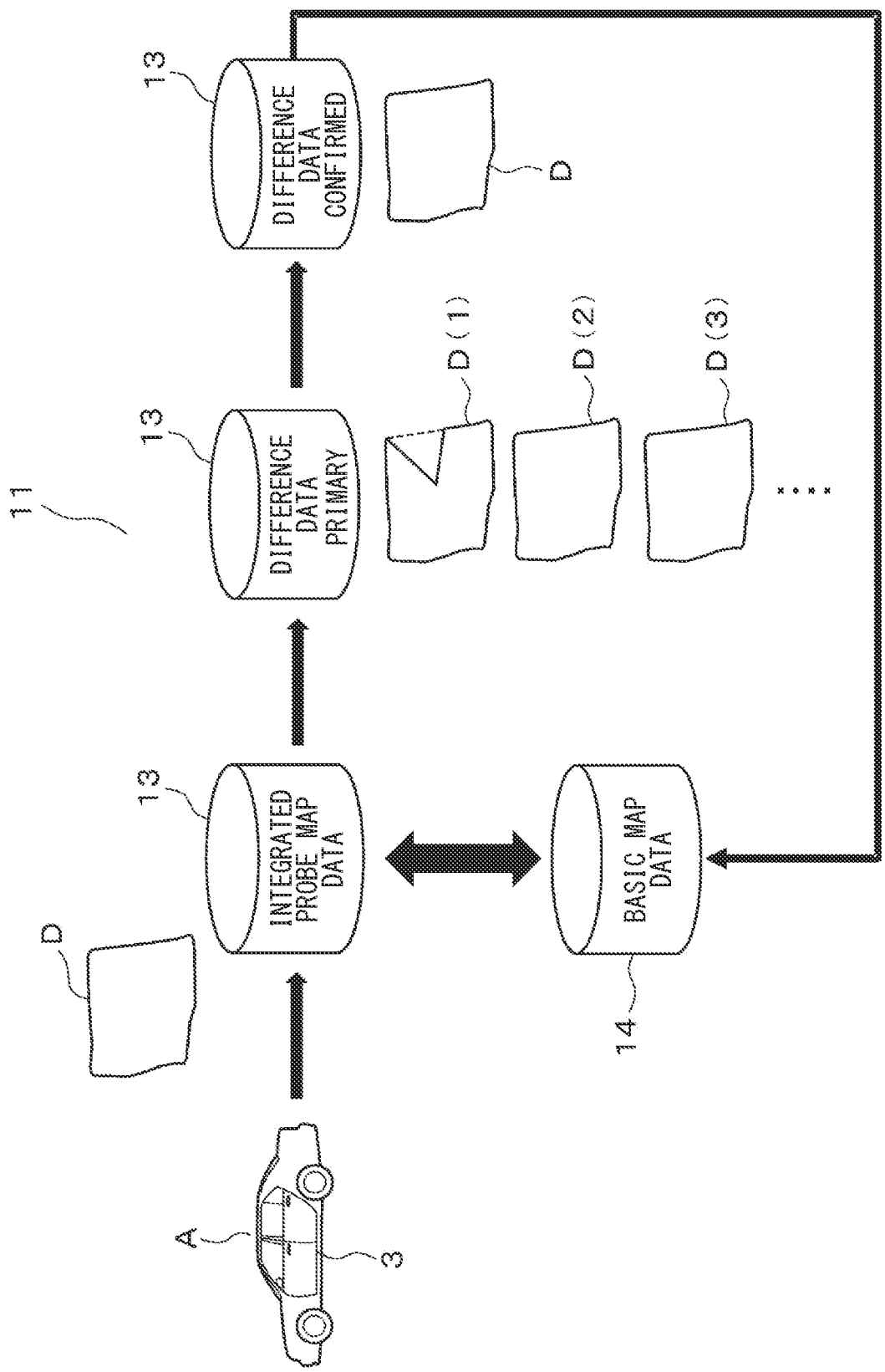
FIG. 3 is a functional block diagram schematically showing processing functions executed by a CPU in a data center.

Hereinafter, a first embodiment will be described with reference to FIGS. 1 to 7. FIG. 1 schematically shows an overall configuration of a map generation system 1. Here, the map generation system 1 includes a data center 2 and an in-vehicle apparatus 3 provided in each of a vehicle group A including a plurality of vehicles A (only one is shown in FIG. 3) traveling on roads. Specifically, the vehicle group A includes a whole of general automobiles such as a passenger car and a truck. The data center 2 functions as a map data generation apparatus according to the present embodiment. The map data generation apparatus collects probe data from a large number of vehicles A and generates/updates a road map data.

The in-vehicle apparatus 3 mounted on each vehicle A includes a computer, peripheral devices thereof, a wireless communication device, and the like. Specifically, as shown in FIG. 1, the in-vehicle apparatus 3 includes a CPU 4, an in-vehicle camera 5, a GPS receiver 6, a vehicle position acquisition device 7, a position database 8, a map database 9, and a network interface (NWI/F) 10 connected to the CPU 4. The in-vehicle camera 5 captures an image of the surroundings. The in-vehicle camera 5 is mounted on the vehicle A and provided, for example, on the front, rear, left and right sides of the vehicle A. The in-vehicle camera 5 captures a peripheral image while the vehicle A is traveling, and the captured image data is input to the CPU 4. The in-vehicle camera 5 may have a function at least to capture an image of the front of the vehicle A.

As is well known, the GPS receiver 6 receives radio waves from GPS satellites, and can determine the position of the host vehicle based on the received data. The vehicle position acquisition device 7 detects the position of the host vehicle from various in-vehicle sensors such as a distance sensor, an acceleration sensor, and a gyro sensor. The signals from the GPS receiver 6 and the vehicle position acquisition device 7 are input to the CPU 4, and the vehicle position is detected with high accuracy. The CPU 4 associates the captured image data of the in-vehicle camera 5 with the traveling information of the vehicle A and the position information of the vehicle A as probe data when the vehicle A is traveling, and stores such probe data in the position database 8.

The probe data may include the image data itself, but instead, it may include the position coordinates of the land feature specified by analyzing the image data. The land features here include road lane markings, road markings such as stop lines, and landmarks such as road signs, poles, signboards including commercial signboards. The road lane markings are not limited to those painted in solid lines or broken lines, but also include road studs such as Botts' dots or cat's eyes, in other words, dotted road lane markings. According to the configuration in which the observed position coordinates of the land features are uploaded as probe data, the amount of communication can be suppressed as compared with the case of uploading the image data itself. The processing load in the data center 2 can also be reduced.

Further, the probe data may be configured to include information indicating the reliability of the probe data. The information indicating the reliability of the probe data may include the estimation accuracy of the vehicle position, more specifically, the positioning accuracy by GNSS, the accuracy and quality in the in-vehicle camera 5, the performance and model number of the image recognition chip, and the like. When uploading the observed position coordinates of the land feature, the information indicating the reliability of the position detection of the object target in the vehicle A corresponds to the information indicating the reliability of the probe data. In addition to the above information, the reliability of the position detection of the object target in the vehicle A may include information such as the type of sensor used to identify the feature, the weather condition such as sunny or rain or snow, the brightness of the external environment, such as day or night, and vehicle speed.

The network interface 10 is connected to a communication network (not shown) such as the Internet, and data can be transmitted/received to/from the data center 2 by wireless communication. In this case, the probe data recorded in the position database 8 is transmitted to the data center 2 periodically, for example, once a day by the network interface 10. The map database 9 stores, for example, nationwide road map information. In this case, the latest map data is distributed and updated from the data center 2 to the map database 9 via the network interface 10.

In contrast, the data center 2 includes a server computer and its peripheral apparatuses, a large-capacity storage device, a wireless communication device, and the like. Specifically, the data center 2 includes a CPU 11, a probe database 12, an intermediate database 13, a master map database 14, and a network interface (NWI/F) 15 connected to the CPU 11. In this case, as will be described in detail later, with the hardware and software configurations, the CPU 11 implements the functions as a probe data collection device 16, a probe data integration device 17 as a probe map data generation device, a comparison processing device 18, a transient data discrimination processing device 19, and a map data update device 20.

In this case, a high-precision basic map data that can be used also for an automatic driving control of the vehicle A is generated/updated and stored in the master map database 14. Then, the high-precision basic map data stored in the master map database 14 is also distributed to each vehicle A; the equivalent data is stored in the map database 9 in the in-vehicle apparatus 3 in the vehicle A. Further, the probe database 12 stores probe data transmitted from the vehicle A. The intermediate database 13 stores data that is intermediately generated in each process of updating the map data in the CPU 11, that is, integrated probe map data and difference data that will be described later.

The network interface 15 performs data communication with the in-vehicle apparatus 3 of each vehicle A via the Internet or the like, and receives probe data transmitted from a large number of in-vehicle apparatuses 3. In this case, probe data are collected from, for example, general vehicles A traveling all over Japan. The probe data collection device 16 collects a large number of probe data via the network interface 15 and stores them in the probe database 12.

The probe data integration device 17 converts captured image data into a plane image from directly above, extracts roads and landmarks, and extracts a large number of collected probe data, and integrates these data. The integrated probe map data is thus generated for each road section or road link. The integrated probe map data mainly includes data on the positions of road lane markings such as the center line of the road, lane boundaries, and outside lines of the road, and position data of landmarks such as signboards and road signs. In this case, the probe data integration device 17 generates integrated probe map data when a required number of probe data, for example, 10 probe data are collected for each section or road link as a data management unit.

The integration process at this time is performed, for example, by averaging the data. For example, the probe map data includes an average value of the positions of road lane markings observed by a plurality of vehicles, an average value of the positions of landmarks such as signboards and road signs, and the like. The generated integrated probe map data is written and stored in the intermediate database 13. Hereinafter, the integrated probe map data will also be referred to as an integrated map. The process of integrating a plurality of probe data for each road section or road link as a data management unit and generating an integrated probe map for each road section or road link is also described as an integration process.

The probe data integration device 17 may be configured to periodically execute an integration process for each road section or road link at a predetermined integration cycle or period of time without considering the degree of probe data collection, that is, without considering how many probe data have been collected. The required number of probe data to generate integrated probe map data need not be defined. The integration cycle or period of time can be, for example, 2 weeks or 1 month. When the integration cycle is one month, the probe data integration device 17 generates integrated probe map data for each road section or road link based on the probe data collected in the last one month every month. If it is not possible to generate an integrated map with probe data within the last month due to lack of data, the probe data collected retroactively may also be reused to retry the integration process.

The comparison processing device 18 obtains a difference data by performing a process of comparing the integrated probe map data for each road section or road link obtained by integrating the probe data with the basic map data stored in the master map database 14. By the comparison process of the comparison processing device 18, changes in the shape of the road, increase/decrease in lanes, increase/decrease in landmarks, etc. from the basic map data are obtained as difference data in the integrated probe map data. The difference data obtained by the comparison processing device 18 is stored in the intermediate database 13.

As described later in the explanation of the operation, the transient data discrimination processing device 19 performs a process of discriminating transient difference data from the plurality of difference data by a statistical process when the difference data obtained by the comparison processing device 18 is acquired by a predetermined number N for each road section or road link. In this case, the transient data discrimination processing device 19 performs a process of discriminating transient difference data from the plurality of difference data by the statistical process when a predetermined number N is accumulated and obtained. Therefore, in the present embodiment, the transient data discrimination processing device 19 functions as a transient difference data discrimination processing device.

Further, in the present embodiment, a process of discriminating the difference data is performed based on the acquisition of a predetermined number N of the difference data. This predetermined number N is set to a fixed value, for example, 10. In this case, more specifically, a process of discriminating the transient difference data is executed by the transient data discrimination processing device 19 as follows. That is, in one of the difference data, when the error with respect to the average value of the difference data exceeds a threshold value of, for example, ±5%, it is determined the one of the difference data as a transient difference data.

Then, the map data update device 20 removes the transient difference data determined by the transient data discrimination processing device 19 from the N difference data (N being a predetermined number) for each road section or road link, to obtain remaining difference data. The basic map data of the master map database 14 is thereby updated based on the remaining difference data. At this time, the map data update device 20 averages a plurality of difference data excluding the transient difference data, and updates the basic map data based on the average difference data. When the basic map data is updated, the latest updated map data is transmitted to the in-vehicle apparatus 3 of each vehicle A via the network interface 15.

Next, the operation of the CPU 11 of the data center 2 in the map generation system 1 having the above configuration will be described with reference to FIGS. 2 to 7. The flowchart of FIG. 2 shows the processing steps for updating the basic map data executed by each processing device 16 to 20 of the CPU 11. Further, FIG. 3 is a functional block diagram schematically showing the processing functions of the CPU 11 when updating the basic map data. FIGS. 4 to 7 are diagrams for explaining the processes of obtaining the difference between the integrated probe map data and the basic map data by using examples.

In the flowchart of FIG. 2, first, in step S1, a process of collecting probe data and integrating the probe data to generate integrated probe map data is executed. Here, as described above, in the data center 2, the probe data is received from the in-vehicle apparatus 3 of each vehicle A via the network interface 15. The probe data collection device 16 executes a process of storing a large number of collected probe data in the probe database 12. At the same time, the probe data integration device 17 executes a process of generating integrated probe map data for each road section or road link.

Figure 4:
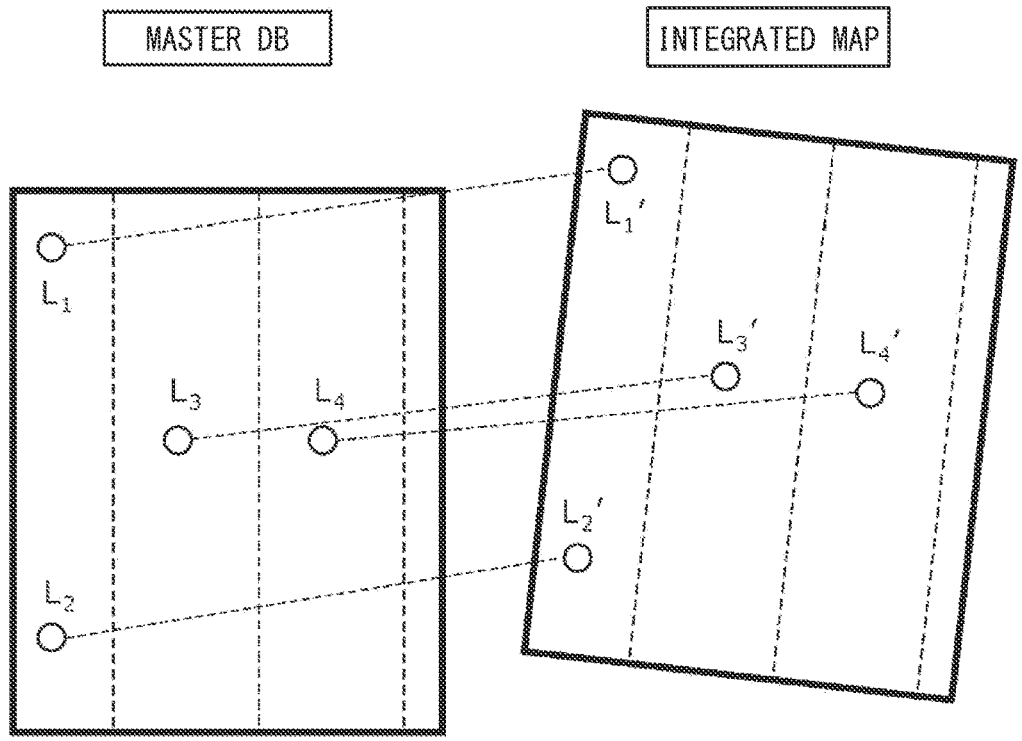
FIG. 4 is a diagram for explaining correction of deviation between an integrated probe map data and a basic map data.

Although detailed explanation is omitted, this process of integrating probe data is performed when a required number, for example, 10 probe data are collected for each road section or road link. The captured image data of the respective probe data are converted into flat images from viewed directly above to extract roads and landmarks, and the extracted data are integrated and averaged. In this case, as shown in FIG. 4 and the like, the integrated probe map data mainly include the position data of the road lane marking M' such as the road center line, the lane boundary line, and the outside line of the road, and the position data of the landmark L' such as a road signs or a signboard. As also shown in FIG. 3, the generated integrated probe map data is written and stored in the intermediate database 13.

Figure 5:
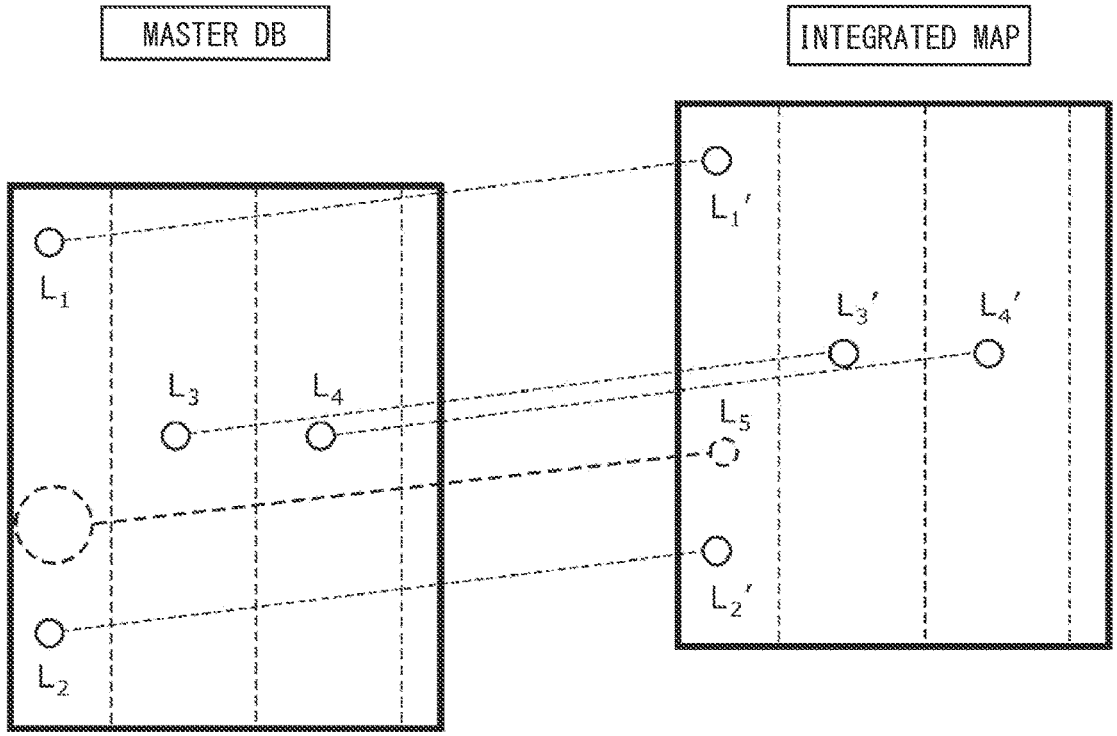
FIG. 5 is a diagram showing a state where there a difference in landmarks between an integrated probe map data and a basic map data.

In the next step S2, the comparison processing device 18 executes a process of comparing the generated integrated probe map data with the basic map data stored in the master map database 14 to obtain the difference data. The process of this comparison will be briefly described. That is, first, the basic map data of the same road section or road link as that of the generated integrated probe map data is read out. At this time, as shown in FIGS. 4 to 6, the basic map data includes the position data of the road lane marking M and the position data of the landmark L.

In the comparison process, first, as shown in FIG. 4, landmarks common to the landmarks L1' to L4' of the integrated probe map data and the landmarks L1 to L4 of the basic map data are extracted. Based on the positions of the extracted common landmarks, the integrated probe map data is rotated and translated so that the positions of the landmarks L1' to L4' match with those of the landmarks L1 to L4. Next, as shown in FIG. 5, it is determined whether or not the landmarks match. In this case, the landmarks L1' to L4' of the integrated probe map data match with the landmarks L1 to L4 of the basic map data, respectively. However, since there is no matching landmark for the landmark L5 of the integrated probe map data, the difference data (i.e., a newly established landmark) is determined.

Figure 6:
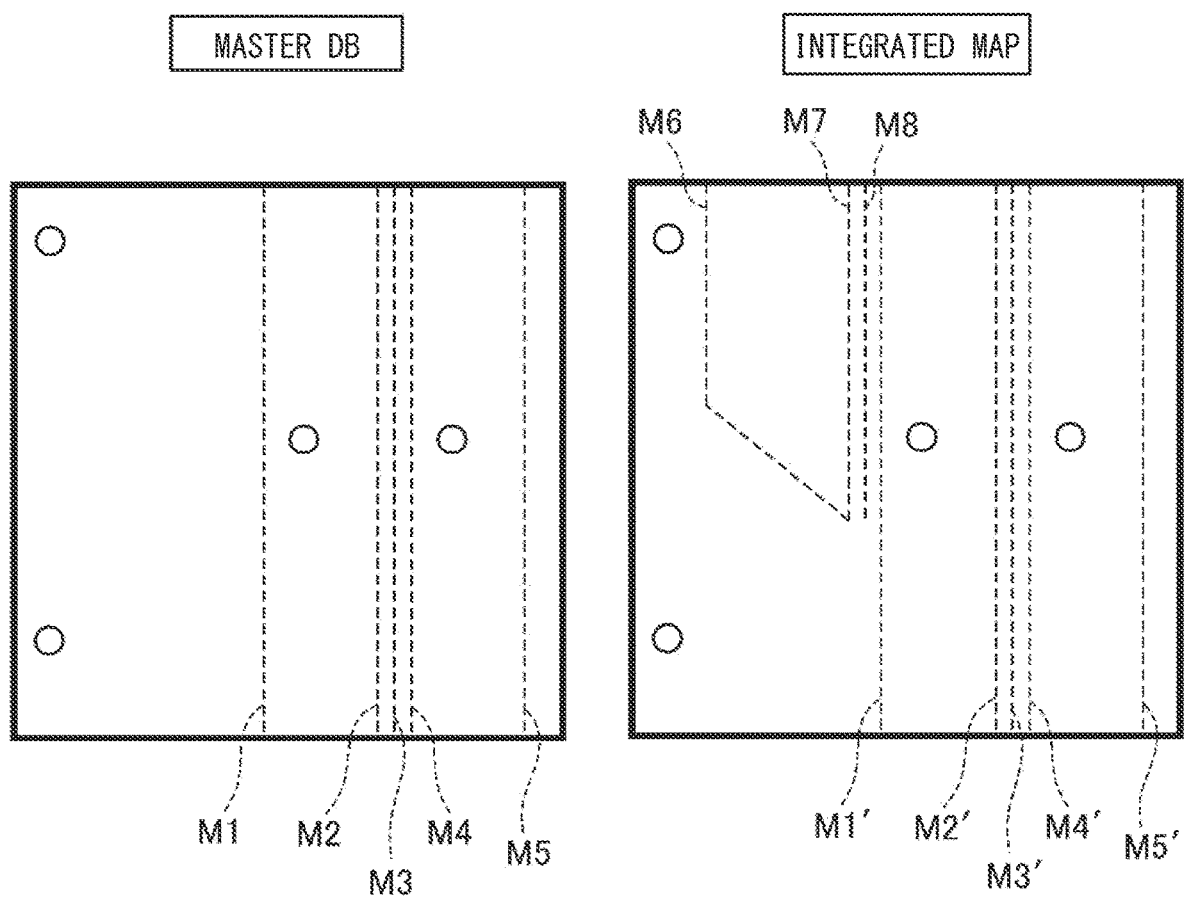
FIG. 6 is a diagram showing a state where there are differences in road lane markings between an integrated probe map data and a basic map data.
Figure 7:
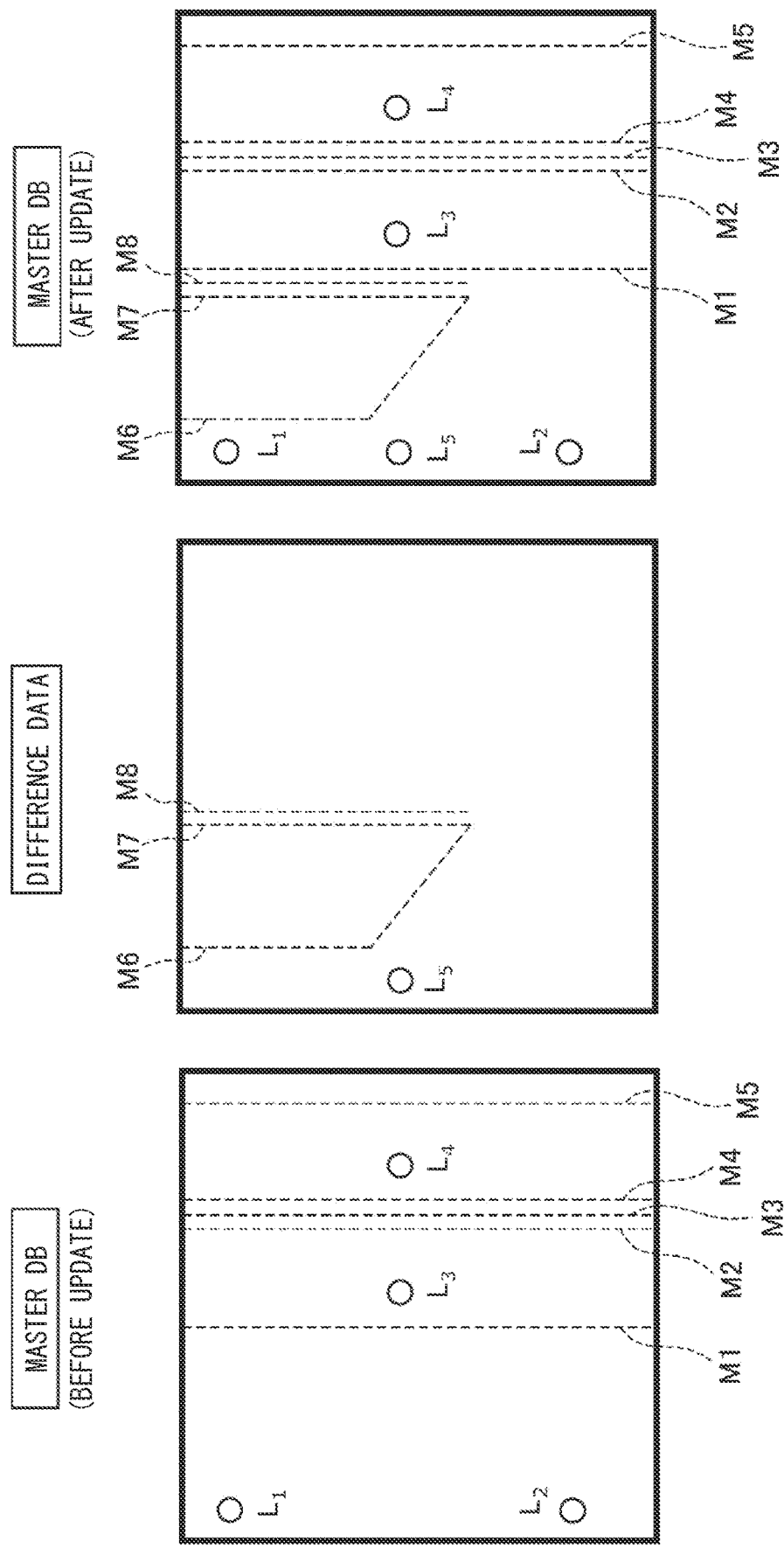
FIG. 7 is a diagram for explaining a state of updating a basic map data based on difference data.

Further, as shown in FIG. 6, it is determined whether or not the road lane marking M' of the integrated probe map data and the road lane marking M of the basic map data match with each other. In this case, the road lane markings M1' to M5' of the integrated probe map data match with the road lane markings M1 to M5 of the basic map data, respectively. However, there are no matching landmarks for the road lane markings M6 to M8 in the integrated probe map data. Therefore, the difference data (i.e., newly established road lane markings) are determined. As a result, as shown in FIG. 7, the landmark L5 and the road lane markings M6 to M8 are used as the difference data D.

When the difference is obtained in this way, returning to FIG. 2, in step S3, it is determined whether or not there is a difference. When there is no difference (No in step S3), the process returns to step S1 and the process of generating integrated probe map data for the next road section or road link is repeated. On the other hand, when there is a difference (Yes in step S3), as shown in FIG. 3, in the next step S4, the difference data D is written and stored in the intermediate database 13 as the primary difference data.

Next, in step S5, it is determined whether or not N difference data D (i.e., the primary difference data, in this case) regarding the same road section or road link have been obtained. Here, N is a predetermined number (e.g., ten or more). When N difference data D have not been obtained yet (No in step S5), the process returns to step S1 and the process of generating integrated probe map data for the next road section or road link is repeated. Then, when a predetermined number N, in this case, 10 primary difference data Ds are obtained (Yes in step S5), the process proceeds to step S6. In step S6, the transient data discrimination processing device 19 executes a specification process of specifying the difference data.

The specification process of the difference data determines whether or not each of the 10 primary difference data D is a transient difference data, and averages a plurality of remaining primary difference data D excluding the data determined to be transient difference data. More specifically, in order to determine whether the data is transient difference data, the average value of 10 primary difference data D is obtained; the error of each difference data with respect to its average value is obtained; when the error exceeds a threshold value, for example, ±5%, it is determined that the data is a transient difference data. As shown in FIG. 3, when a plurality of primary difference data D contain the primary difference data D having a significantly larger error than the other data, the corresponding one (D(i) in FIG. 3) is determined to be a transient difference data and removed.

As shown in FIG. 3, after the transient difference data is removed, the remaining data are averaged to obtain the difference data D, which is determined as a correct difference data. The determined difference data D is stored in the intermediate database 13. In the example of FIG. 7, the data of the landmark L5 and the road lane markings M6 to M8 are determined as the difference data D to be newly added. Returning to FIG. 2, in the next step S7, the map data update device 20 updates the basic map data of the master map database 14 so as to reflect the determined difference data D. Here, as shown in FIG. 7, the new basic map data is obtained by adding the difference data D to the basic map data before the update.

According to such an embodiment, the following effects can be obtained. That is, in the data center 2, the probe data collection device 16 collects probe data from the in-vehicle apparatuses 3 in a large number of vehicles A. The probe data integration device 17 generates probe map data for each road section or road link based on the probe data. Then, the comparison processing device 18 compares the probe map data with the basic map data to obtain the difference data D. The map data update device 20 updates the basic map data based on the difference data D.

When there are changes such as the addition of lanes on the actual road or the establishment of new landmarks near the road, the map data update device 20 promptly updates the basic map data. Therefore, the latest map data can always be obtained. At this time, the difference data D obtained by the comparison processing device 18 are acquired by a predetermined number N for each road section or road link. In this case, the transient data discrimination processing device 19 discriminates the transient difference data D from the difference data by a statistical process. When the probe data includes, for example, distortion or partial loss in the captured image data of the in-vehicle camera 5, the difference data D obtained based on the distortion data D or partial loss is determined to be a transient difference data including a large error.

As a result, when the map data update device 20 updates the basic map data, the transient difference data can be excluded in advance, and the update process can be performed using only the reliable difference data D. As a result, according to the present embodiment, map data is generated/updated based on collecting probe data from a plurality of vehicles A, and the basic map data is no longer updated based on inaccurate difference data. The accuracy of updating the basic map data based on the difference data D can thus be improved.

In the present embodiment, the transient data discrimination processing device 19 is configured to discriminate, as transient difference data, a difference data D of which error with respect to the average value of the difference data D exceeds a threshold value, for example, ±5%. This makes it possible to discriminate transient difference data with simple processing and sufficient certainty.

Further, in the present embodiment, a plurality of difference data D excluding the transient difference data are averaged, and the basic map data is updated based on the average difference data. In this case, by averaging a plurality of difference data D excluding the transient difference data, it is possible to absorb and cancel a slight error included in each difference data D by averaging. The basic map data can be updated using highly accurate average difference data.

In the first embodiment described above, a specification process of the difference data is performed when a predetermined number N of the difference data D is obtained for each road section or road link. At that time, the predetermined number N is fixed to, for example, 10. When the predetermined number N is too small, the reliability will be low. When it is large, the basic map data can be updated from a larger number of difference data and the accuracy is improved, but on the other hand, it takes time to collect probe data and the like. Therefore, it is desirable to set the predetermined number N to an appropriate number that balances them, for example, about 10.

Further, in the above embodiment, the remaining difference data excluding the transient difference data are averaged and determined as the difference data, but other statistical methods such as median and mode may be adopted. Various statistical processes can also be adopted for the process of discriminating transient difference data. Even when the error from the average value is used, it is possible to appropriately change the threshold value and the like.

(2) Second Embodiment

Figure 8:
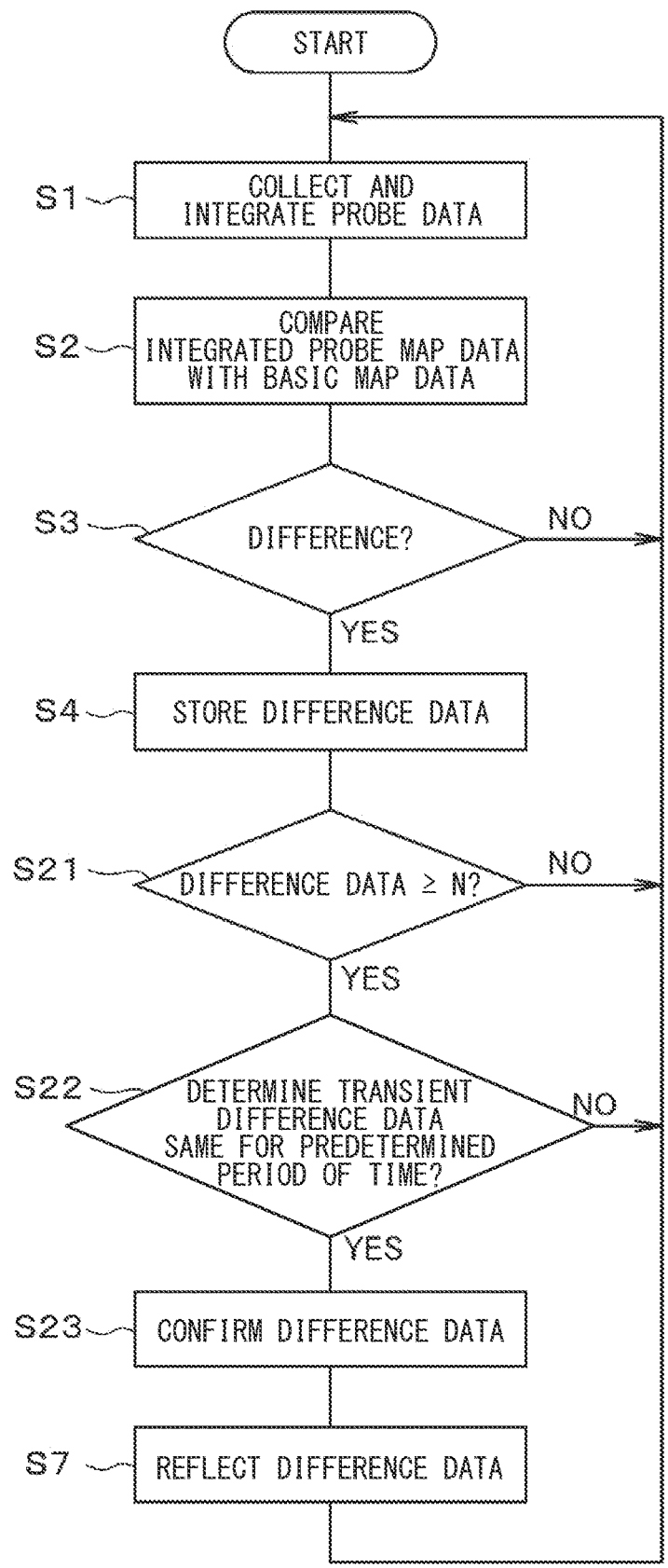
FIG. 8 is a flowchart schematically showing processing steps of a basic map data update according to a second embodiment.

The flowchart of FIG. 8 shows a second embodiment, and shows processing steps of a basic map data update executed by the CPU 11 in the data center 2. The difference between the second embodiment and the first embodiment is in the method for determining whether or not the difference data is a transient difference data. In the first embodiment, the average value of 10 difference data is obtained, and based on the calculation of the magnitude of the error with respect to the average value, it is determined whether or not the difference data is transient difference data. In this second embodiment, instead, it is determined whether or not the primary difference data sequentially generated over time are equivalent for a certain period of time, and it is determined whether or not the primary difference data is transient difference data.

In FIG. 8, in steps S1 to S4, the same processing as the flowchart of FIG. 2 of the first embodiment is performed. That is, in step S1, a process of collecting probe data and integrating them to generate integrated probe map data is executed. In step S2, a process of comparing the generated integrated probe map data with the basic map data stored in the master map database 14 to obtain the difference data is executed. In step S3, it is determined whether or not there is a difference. When there is a difference (Yes in step S3), the difference data D is written to the intermediate database 13 as primary difference data in step S4.

In the next step S21, it is determined whether or not the accumulated number of the difference data D (i.e., the accumulated number of the primary difference data, in this case) relating to the same data management unit (i.e., the road section or road link, in this case) exceeds a predetermined number N (e.g., five). Then, when the predetermined number N is exceeded (i.e., six primary difference data D are obtained, in this case) (Yes in step S21), the process proceeds to step S22. In step S22, the transient difference data is determined. Here, it is determined whether the primary difference data D is transient data or not depending on whether a plurality of primary difference data D are the same for a certain period of time, for example, 5 days. The same as used herein is not limited to the exact the same, and may include a slight error, for example, an error of about 0.05 m or 0.1 m.

When a primary difference data D that is not the same is obtained with respect to a plurality of primary difference data D for the past 5 days (No in step S22), it is determined that such a primary difference data D is a transient difference data and excluded from the difference data. The process returns to step S1. When it is determined that the primary difference data D is the same as the data for the past 5 days (Yes in step S22), the process proceeds to step S23. In step S23, it is determined as a correct difference data, and the difference data D is stored in the intermediate database 13. In the next step S7, the map data update device 20 updates the basic map data of the master map database 14 so as to reflect the confirmed difference data D.

Even in such a second embodiment, when the primary difference data D contain the primary difference data D having a significantly larger error than the other data, it is determined as the transient difference data and excluded from the data used to update the basic map data. Therefore, in the case of generating/updating map data based on collecting probe data from a plurality of vehicles A, the basic map data is not updated based on inaccurate difference data. The accuracy of updating the basic map data based on the difference data D can thus be improved.

(3) Third Embodiment

Figure 9:
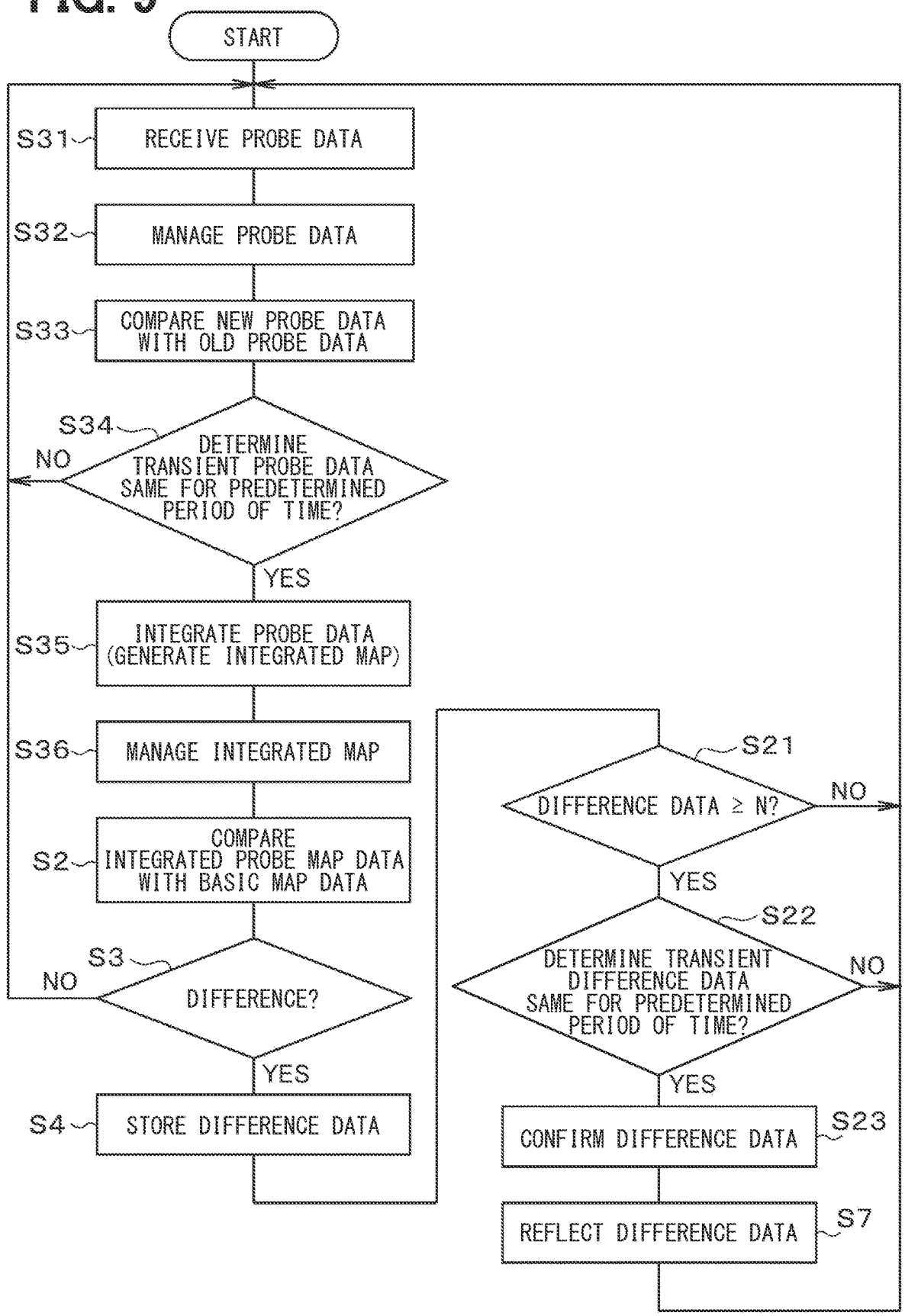
FIG. 9 is a flowchart schematically showing processing steps for a basic map data update according to a third embodiment.

The flowchart of FIG. 9 shows a third embodiment, and also shows the processing steps of the basic map data update executed by the CPU 11 in the data center 2. The third embodiment is different from the first and second embodiments in that a transient probe data discrimination processing device is provided to discriminate, by a statistical process, a transient probe data from a plurality of probe data collected by the probe data collection device 16 by a predetermined period of time, as a transient data discrimination device. Then, the processing after the integration processing is performed from the plurality of probe data excluding the transient probe data.

That is, in step S31, the probe data collection device 16 receives the probe data from the in-vehicle apparatuses in the vehicles A. In step S32, the received probe data are stored in the probe database 12 and managed in units of time, for example. In step S33, old and new probe data are compared for each road section or road link. In the next step S34, it is determined whether or not the newly collected probe data is a transient probe data. Here, whether or not the data is transient is determined by whether or not a plurality of probe data in the same road section or road link are the same for a certain period of time, for example, about 3 hours. The determination as being the same is considered to allow a slight error.

When the probe data are not the same over a certain period of time (No in step S34), it is determined that the probe data being not the same is a transient probe data. The transient probe data is excluded from the probe database 12, the process returns to step S31. On the other hand, when it is determined that the probe data are the same over a certain period of time (Yes in step S34), the probe data are determined to be correct. Then, in step S35, the probe data integration device 17 executes a process of integrating the probe data for each road section or road link to generate the integrated probe map data. In step S36, the generated integrated probe map data is written to the intermediate database 13 and stored and managed.

Subsequent processing is executed in the same manner as in the second embodiment. That is, in step S2, the generated integrated probe map data is compared with the basic map data of the master map database 14, and the difference data is obtained. In step S3, it is determined whether or not there is a difference. When there is a difference (Yes in step S3), the process proceeds to step S4. In step S4, the difference data D is written to the intermediate database 13 as primary difference data and managed. In the next step S21, it is determined whether or not the number of accumulated difference data exceeds the predetermined number N.

Then, when, for example, 6 difference data exceeding the predetermined number N are obtained (Yes in step S21), the process proceeds to step S22. In step S22, the transient difference data is determined depending on whether the difference data are the same for a certain period of time, for example, 5 days. When it is determined that the difference data are the same as the data for the past 5 days (Yes in step S22), the process proceeds to step S23. In step S23, the difference data are confirmed to be correct difference data, and are stored in the intermediate database 13. In the next step S7, the map data update device 20 updates the basic map data of the master map database 14 so as to reflect the confirmed difference data D.

According to such a third embodiment, when the collected probe data includes probe data having a significantly larger error than other data, it is regarded as a transient probe data. such a transient probe data is excluded from the probe database 12, and is not used for updating the basic map data. Therefore, the map data is generated/updated based on the collection of probe data from a plurality of vehicles A, while the basic map data can be prevented from being updated based on inaccurate probe data. The accuracy of updating the basic map data can be improved.

In the third embodiment, as a method for discriminating transient probe data, it is determined whether a plurality of probe data are the same for a certain period of time. However, it is also possible to determine whether the collected probe data has an error exceeding the threshold value with respect to the average value of the plurality of probe data collected within the most recent fixed period. Further, in the third embodiment, transient data is discriminated for both probe data and difference data. However, the configuration may be such that transient data is discriminated only with respect to probe data.

(4) Other Embodiments

In each of the above embodiments, the wording "road section or road link" is used as a data management unit for probe data and map data. However, the data management unit also includes the concept of each of meshes into which a map is divided. Here, with reference to FIG. 10, meshes into which a map is divided as data management units will be described.

Figure 10:
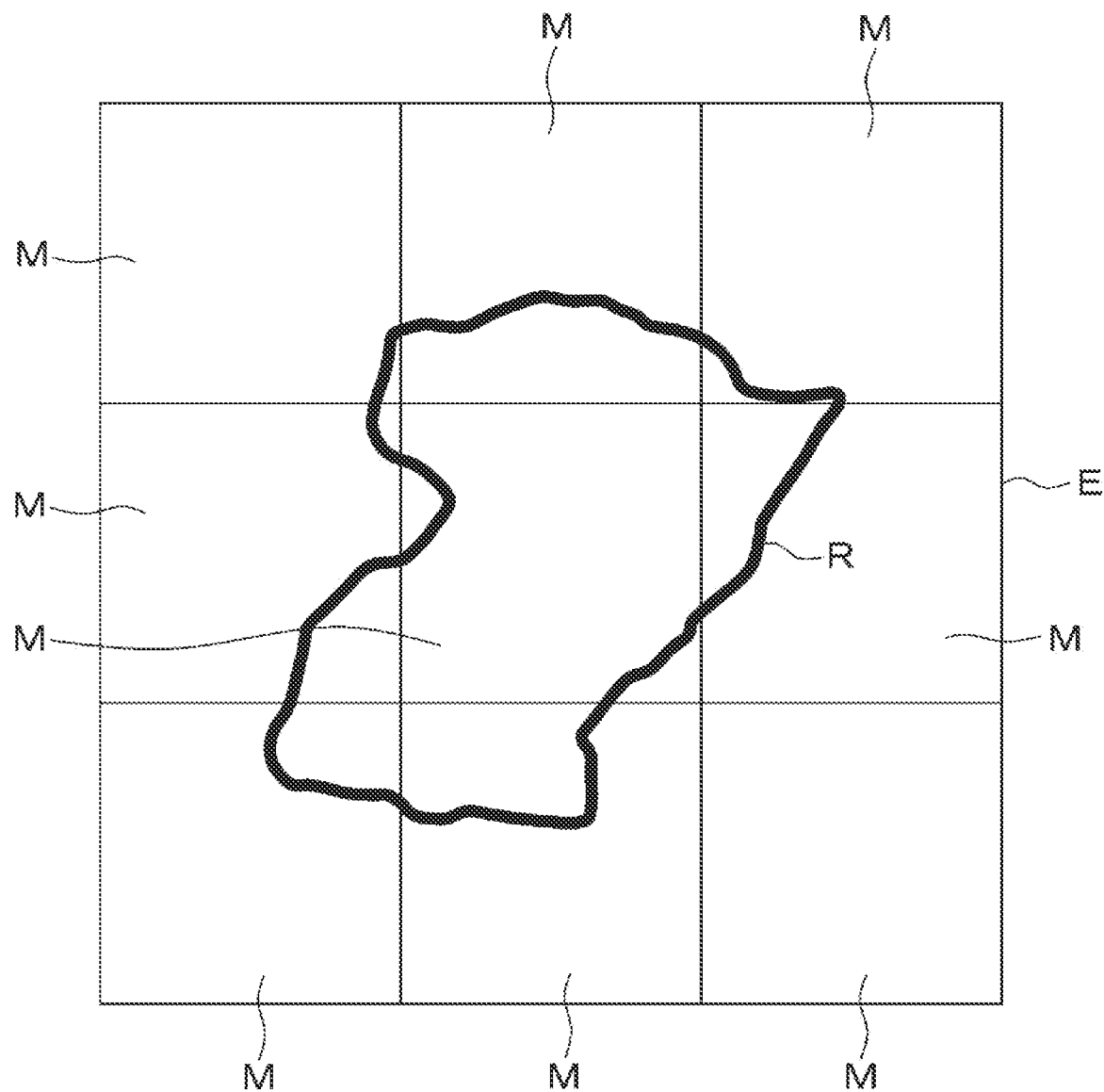
FIG. 10 is a diagram showing an example of meshes into which a map is divided as data management units according to another embodiment.

FIG. 10 shows an example of meshes M into which the area E of the map data is divided vertically and horizontally, that is, in the north-south direction and the east-west direction in a rectangular shape, and the area E includes a road R. Each mesh M can also be called a map tile, and corresponds to a map data of a respective area. Each mesh M has, for example, a square shape of 2 km square. The size of the mesh M can be changed as appropriate, such as 1 km square, or 4 km square. Further, the shape of the mesh M may be a rectangle, a hexagon, a circle, or the like. Each mesh M may be set so as to partially overlap the adjacent mesh M. The size of the mesh M may be different for each layer or each road type.

Further, the size and shape of the mesh M may be non-uniform. For example, the mesh M in a rural area where the presence density of map elements such as landmarks is relatively sparse may be set larger than the mesh M in an urban area where the map elements are densely present. For example, the mesh M in the rural area may have a rectangular shape of 4 km square, while the mesh M in the urban area may have a rectangular shape of 1 km or 0.5 km square. The urban area here refers to, for example, an area where the population density is equal to or larger than a predetermined value or an area where offices and commercial facilities are concentrated. The rural area may be an area other than the urban areas.

In addition, the distribution mode of all map data may be defined by the data size. In other words, the map recording area may be divided and managed within a range defined by the data size. In that case, each mesh M is set so that the amount of data is less than a predetermined value based on the number or density of landmarks. According to such an aspect, the data size in one delivery can be set to a certain value or less. It is assumed that the real space range corresponding to the mesh M in the urban area is narrower than the real space range corresponding to the mesh M in the rural area. As mentioned above, it is expected that map elements such as landmarks or lane markings will be more densely present in urban areas than in rural areas.

Further, each of the above-described embodiments can be modified and implemented as follows, for example. That is, there is a circumstance that the accuracy of the probe data, in other words, the reliability, changes depending on the hardware resources used for collecting the probe data provided in the vehicle A, for example, the accuracy and quality of the in-vehicle camera 5. Therefore, the predetermined number N may be configured to be varied so as to become smaller as the accuracy is higher, depending on the accuracy of the probe data, that is, the reliability. As a result, when the accuracy of the probe data is high, the basic map data can be updated in a short time. Even when the accuracy of the probe data is relatively low, it is possible to update the basic map data with sufficiently high accuracy by using a large number of difference data.

Here, the accuracy of the individual probe data corresponds to the accuracy of the integrated probe map data generated using them. The above configuration corresponds to a configuration in which the higher the accuracy of the integrated probe map data, the smaller the required number N of the difference data used for map update. In a configuration in which the required number of probe data used for the integrated process is specified, the higher the accuracy of the probe data, the smaller the number of probe data required for the integrated process can be reduced. In addition, the weighting for each probe data in the integration process can be changed according to the accuracy of the probe data. For example, the probe data integration device 17 averages the probe data by increasing the weight as the accuracy increases. According to such a configuration, the content of the probe data with high accuracy is strongly reflected in the integrated map and the difference data, so that the accuracy of the updated map can be further improved.

In addition, the hardware configuration, software configuration, and the like of the in-vehicle apparatus 3 (vehicle A) and the data center 2 can be variously changed and implemented. Although the disclosure has been described in accordance with the embodiments, it is understood that the present disclosure is not limited to such embodiment or structures. The present disclosure incorporates various modifications and variations within the scope of equivalents. In addition, various combinations and configurations, as well as other combinations and configurations that include only one element, more, or less, are within the scope and spirit of the present disclosure.

The map data generation apparatus as the data center 2 and the in-vehicle apparatus 3 and methods thereof described in the above embodiments in the present disclosure may be implemented by one or more than one special-purpose computer. Such a special-purpose computer may be created (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more special purpose hardware logic circuits. The computer programs may be stored, as instructions being executed by a computer, in a tangible non-transitory computer-readable storage medium.

For reference to further explain features of the present disclosure, the description is added as follows.

For example, as a technology for generating a digital road map used for a car navigation apparatus or automatic driving control, a system that generates/updates map data based on probe data collected from a plurality of probe cars can be considered. This system connects communicably multiple vehicles, which are probe cars, to a center. The center collects, as probe data, (i) the image data taken by in-vehicle cameras along the running of the respective vehicles and (ii) the running position data of the respective vehicles. Then, the center reproduces the traveling locus of each road from the probe data and updates the map data based on the difference detected from the map data in the database.

In the above system, the probe data collected from the probe cars may contain, for example, distortion or partial loss in the captured image data of the in-vehicle cameras. Then, the map data may be updated based on the inaccurate data. The accuracy of the updated map data may thus decrease due to variations in the quality of the probe data and the like.

Therefore, it is thus desired for the present disclosure to provide a map data generation apparatus configured to generate and update map data based on collecting probe data from a plurality of vehicles, to improve the accuracy of updating the map data.

An aspect of the present disclosure described herein is set forth in the following clauses.

According to an aspect of the present disclosure, a map data generation apparatus is provided to include: a probe data collection device; a probe map data generation device; a map data update device; and a transient data discrimination processing device. The probe data collection device is configured to collect a plurality of probe data from a plurality of vehicles. The probe map data generation device is configured to generate probe map data for each of data management units corresponding to (i) road sections, (ii) road links, or (iii) meshes into which a map is divided, based on the plurality of probe data collected by the probe data collection device. The map data update device is configured to obtain a difference data by comparing a basic map data with the probe map data generated by the probe map data generation device, and update the basic map data based on a plurality of difference data, for each of the data management units. The transient data discrimination processing device is configured to discriminate a transient data from a data that is the probe data or the difference data and exclude the transient data from the data.

According to this, the probe data collection device collects probe data from a plurality of vehicles. The probe map data generation device generates probe map data for each of data management units, which are road sections or road links, or meshes into which a map is divided, based on a plurality of probe data. The map data update device obtains difference data by comparing basic map data with the probe map data generated by the probe map data generation device, and updates the basic map data based on a plurality of difference data for each of the data management units. Suppose a case where there were changes such as the addition of lanes on the actual road and the establishment of new landmarks near the road. In such a case, the map data update device promptly updates the basic map data, and can obtain the latest map data always.

In this case, the transient data discrimination processing device discriminates the transient data from the data which is the probe data or the difference data and excludes the transient data from the data. Suppose a case where in the probe data, for example, the captured image data of the in-vehicle camera is distorted or partially missing. In such cases, the probe data itself or the difference data obtained based on the probe data can be discriminated as the transient difference data including a large error. As a result, when updating the basic map data in the map data update device, it is possible to eliminate transient data including errors in advance. The update process can be performed using only reliable data, and the map data will not be updated based on inaccurate data. As a result, the map data can be generated and updated based on the collection of probe data from a plurality of vehicles, and the accuracy of updating the map data can be improved.

What is claimed is:

1. A map data generation apparatus comprising:
    a probe data collection device configured to collect a plurality of probe data from a plurality of vehicles;
    a probe map data generation device configured to generate probe map data for each of data management units corresponding to (i) road sections, (ii) road links, or (iii) meshes into which a map is divided, based on the plurality of probe data collected by the probe data collection device;
    a comparison processing device configured to obtain difference data by comparing basic map data with the probe map data generated by the probe map data generation device;
    a transient difference data discrimination processing device configured to discriminate transient difference data from the difference data obtained by the comparison processing device by a statistical process in response to acquiring the difference data by a predetermined number N or by a predetermined period of time for each of the data management units, wherein the N is more than one; and
    a map data update device configured to update the basic map data based on remaining difference data being obtained by excluding the transient difference data discriminated by the transient difference data discrimination processing device from the difference data for each of the data management units.

2. The map data generation apparatus according to claim 1, wherein:
    the map data update device is further configured to average the remaining difference data to provide average difference data and update the basic map data based on the average difference data.

3. The map data generation apparatus according to claim 1, wherein:
    the predetermined number N or the predetermined period of time is changed so as to become smaller as an accuracy of the probe data is higher.

4. The map data generation apparatus according to claim 1, wherein:
    the transient difference data discrimination processing device is further configured to discriminate a first difference data among the difference data as the transient difference data, in response to the first difference data having an error exceeding a threshold value, the error being with respect to an average value of the difference data.

5. The map data generation apparatus according to claim 1, comprising:
    a transient probe data discrimination processing device configured to discriminate, by a statistical process, transient probe data from the probe data collected by the probe data collection device by a predetermined period of time,
    wherein:
    the probe map data generation device is further configured to generate the probe map data for each of the data management units, based on the plurality of probe data excluding the transient probe data.

6. The map data generation apparatus according to claim 1, wherein:
    each of the probe data includes information indicating a reliability of a position detection in the vehicle for an object target; and
    the probe map data generation device is further configured to generate the probe map data for each of the data management units by averaging the plurality of probe data while changing a weighting at averaging the plurality of probe data according to the reliability included in the probe data.

7. A map data generation apparatus comprising:
    one or more memories; and
    one or more processors communicably connected to the one or more memories,
    wherein the one or more processors are configured:
    to collect a plurality of probe data from a plurality of vehicles;
    to generate probe map data for each of data management units corresponding to (i) road sections, (ii) road links, or (iii) meshes into which a map is divided, based on the plurality of probe data;
    to obtain difference data by comparing basic map data with the probe map data;
    to discriminate transient difference data from the difference data by a statistical process in response to acquiring the difference data by a predetermined number N or by a predetermined period of time for each of the data management units, wherein the N is more than one; and
    to update the basic map data based on remaining difference data being obtained by excluding the transient difference data from the difference data for each of the data management units.

* * * * *